June 16, 1953 K. VONDERS 2,641,803
METHOD AND MACHINE FOR REMOVING FIBERS FROM PLANT STEMS
Filed Feb. 16, 1948 6 Sheets-Sheet 5

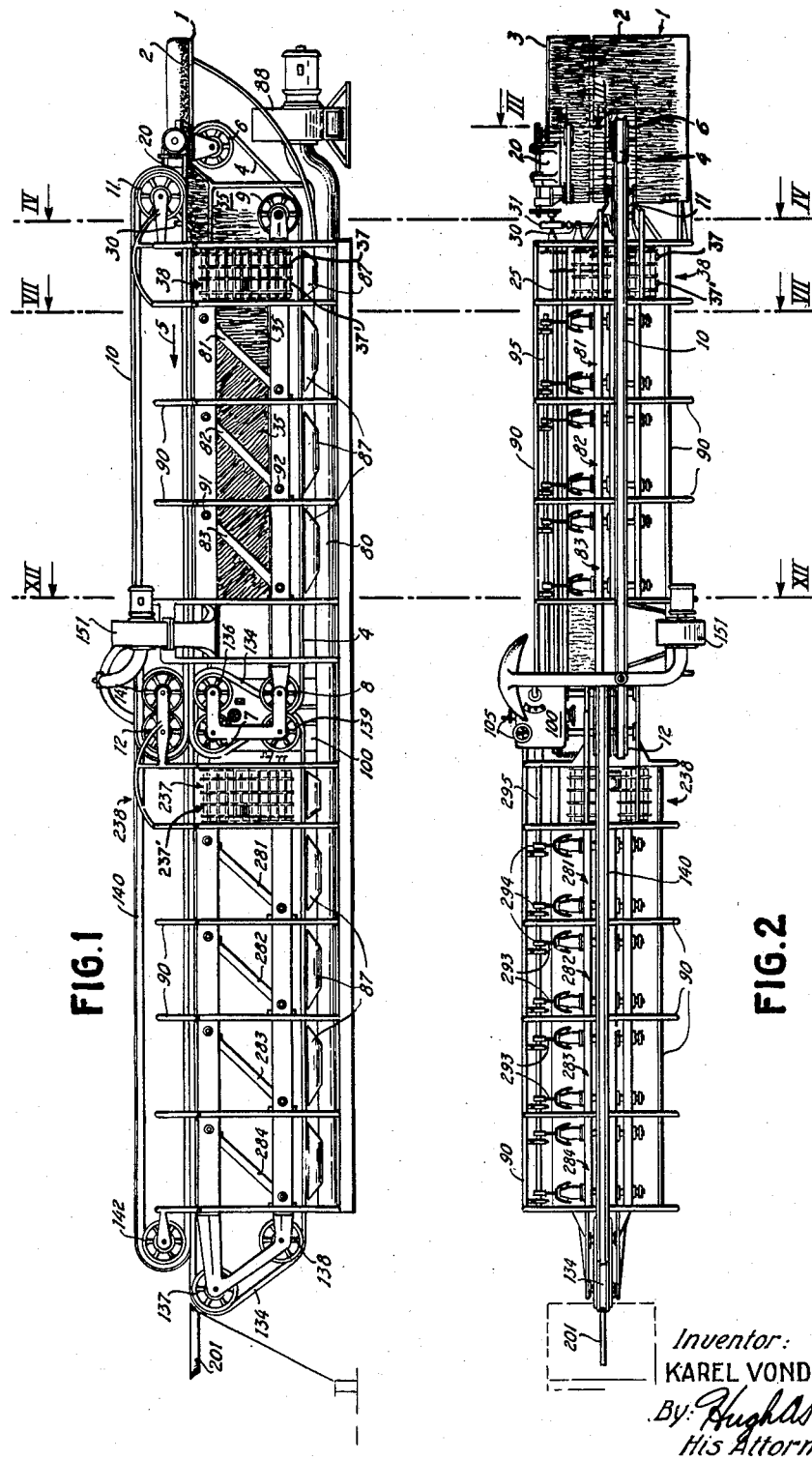

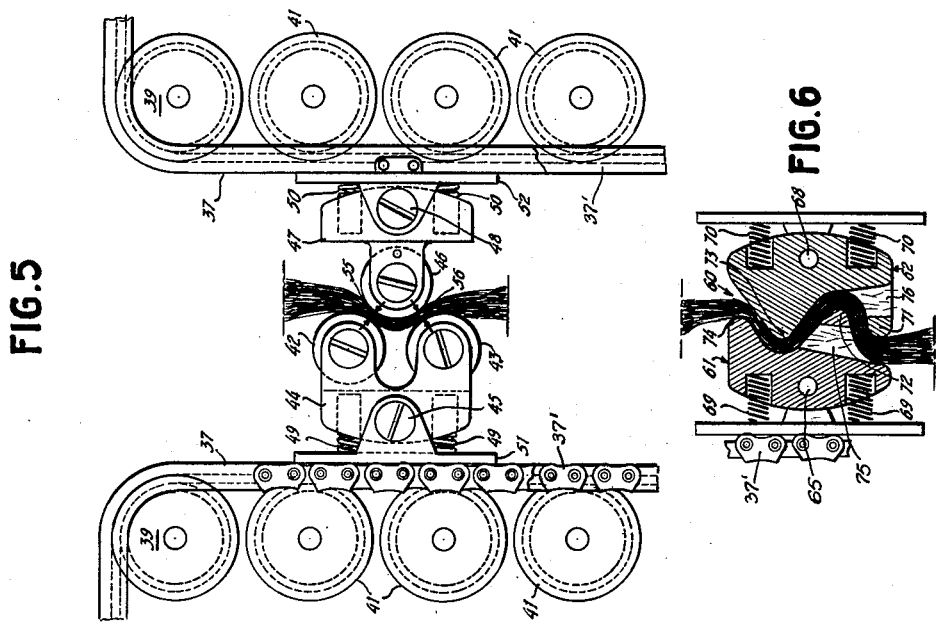
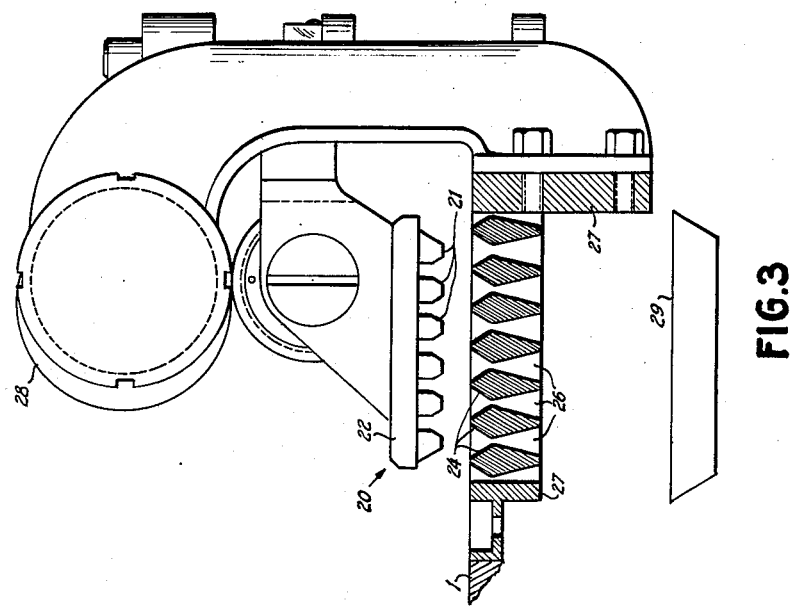

*Inventor:*
KAREL VONDERS
By: Hugh A. Kirk
*His Attorney*

UNITED STATES PATENT OFFICE 2,641,803

METHOD AND MACHINE FOR REMOVING FIBERS FROM PLANT STEMS

Karel Vonders, Holten, Netherlands, assignor of eighty per cent to Jacobus Nolten, Holten, and twenty per cent to Willem Frederik Hendrik Zegers, The Hague, Netherlands Application February 16, 1948, Serial No. 8,696
In Switzerland February 19, 1947

35 Claims. (Cl. 19—13)

This invention relates to a new method and machine for removing the fibers from the stems of plants such as flax, hemp, jute, ramie, and the like. More particularly it deals with a method and machine for mechanically separating such fibers from the other parts of the plant such as the roots, the pith, the pectin, and other woody materials not a part of the fibers.

Previously, such plants have been retted to loosen the non-fibrous materials and then the plants have been passed between corrugated rollers to break their stems and roots and loosen the woody materials which then are beaten from the stems by paddles or mechanical flails. This process weakens, entangles, and often cuts many of the fibers as well as producing a loss of a considerable percentage of the fibers so treated.

It is an object to this invention to separate the fibers from plants containing them in a new, efficient, effective and economic manner without the loss of fibers and without entangling or weakening the fibers.

Another object is to separate such fibers mechanically without the necessity of pre-treating or retting the plants containing the fibers.

Another object is to produce a machine for separating such fibers from plants without entangling, cutting, or losing the fibers as well as recovering the non-fibrous materials so separated.

According to this invention the non-fibrous or woody materials are removed from stems of such fibers containing plants by first breaking the stems containing the fibers to loosen the woody materials and then repeatedly, quickly, and longitudinally jerking and stretching the fibers to separate these non-fibrous or woody materials completely from the fibers. This stretching step is based upon the relatively higher ductility and flexibility of the fibers in the plants than that of the non-fibrous or woody materials which are to be separated from said fibers. The drier the non-fibrous or woody materials and the wetter and more flexible the fibers, the more effective is the separation by this method. The step of breaking or bending the stems to loosen the woody materials and pith from the fibers may be accomplished simultaneously with the step of vibrating and stretching the fibers, however, it is more desirable to previously break the stems in one or more separate operations which may include first splitting the stems longitudinally, and then sharply bending the stems to break them so that they will hang loosely before vibrating and stretching them. This stretching operation is analogous to the shaking of a powder from a string which is fastened at one end and shaken at the other end, and then after the string is vibrating in one or more nodes the string is quickly stretched as a result of which the small particles of powder still sticking to the string are immediately thrown off. According to this invention, this operation is repeated along each section of one or more centimeters of the stem of a plant in rapid succession, say at a rate of at least about one thousand times per minute.

Since the roots often remain on the stems of the plants to be treated and contain substantially no fibrous material, they may be removed by pounding them to break away their non-fibrous woody portions without damaging the ends of the fibers in the stems adjacent the roots. This pre-removal of the roots is not necessary, however, in that the breaking and/or vibrating and stretching steps will also remove the roots from the stems.

One embodiment of a machine for carrying out this process comprises essentially a clamping and stretching means having two pairs of parallel spaced co-operating jaws which may be composed of inter-engaging teeth or ribs for transversely breaking and grabbing the stems of the plants at two different places simultaneously along their stems. This clamping means includes resiliently mounting one of the two co-operating jaws of each pair of jaws, which resilient mountings are located on opposite sides of the stem being clamped between both pairs of jaws, so that any motion of the clamping means toward each other after the stem is clamped will stretch that part of the stem residing in the space between the two parallel jaws. Means are also provided to open and close or vibrate the jaws of said clamping means in rapid repetition as the stems of the plant are moved longitudinally between said parallel pairs of jaws. This clamping and stretching means may take the form of opposing lath along the edges of each of which are positioned inter-engaging ribs to form longitudinal jaws. One or both of these laths may be vibrated to and from each other and they may be placed in such a position or angle with respect to the motion of the stem of the plants which are to be passed between them so that the stems will always be at substantially right angles to the jaws of the laths and these jaws will pass along the length of the stem as the stems are moved by the jaws. These jaws may be made of any suitable hard material, such as metal or wood, however, the lighter material, such as aluminum or wood, is preferred, in that less power is required to vibrate lighter clamping means than heavier clamping means at a speed of 1000 or more vibrations per minute. If the jaws are made of wood, which is not as strong as metal, it is more desirable to pre-heat the stems and pre-break them including removal of their roots, in order to increase the life of the clamping and stretching means. Thus, in a preferred embodiment of this invention, the stems are first longitudinally stripped by being passed longitudinally between three overlapping rollers, and/or through an S-shaped groove or channel in a block to break the stems so that they will hang limp before being passed between the jaws of the clamping and stretching means. Also, means may be provided for pounding or pulverising the roots to remove them from the stems before they are passed between the jaws of the clamping and stretching means.

If desired, the stems may be conveyed through the machine automatically by a conveyor which holds one portion of the stems while the other portion is being treated and then automatically engages the treated portion so that the previously held and untreated portion of the stems may be treated. The stems are aligned and conveyed through the machine as a sheet of fibers of one or only a few stems in thickness. The feed to such an automatic machine may comprise a table upon which an operator lays the stems with their roots all at one end of the table upon which table the roots may be pulverised before the stems are fed between two closely opposing endless belts which clamp and feed the stems continuously through the machine. The machine may also be provided with hoppers and suction means to collect and remove all of the non-fibrous materials separated from the stems in the machine.

There may be provided means for adjusting the degree of stretch of each of the clamping means and their speed of operation as well as the speed of the conveyor, the root pulverizer, the splitting and the breaking means depending upon the type of stems being processed and the degree of moisture present in these stems. The more moisture present the more stretching and vibrating of the stems is required to remove the non-fibrous materials.

The above mentioned and other features and objects of this invention and the manner of attaining them will become more apparent and the invention itself will be best understood, by reference to the following description of an embodiment of the invention taken in conjunction with the accompanying drawings, wherein:

Fig. 1 is a longitudinal elevation of one embodiment of the machine of this invention.

Fig. 2 is a top plan view of the machine shown in Fig. 1.

Fig. 3 is an end view partially in section of one embodiment of a root pulverizing means which may be mounted on the table shown in Fig. 2.

Fig. 5 is a detail end view of the splitting rollers which may be employed on the mechanism shown in Fig. 4;

Fig. 6 is detailed sectional view of the breaking blocks which may be employed on the mechanism shown in Fig. 4;

Figure 11:
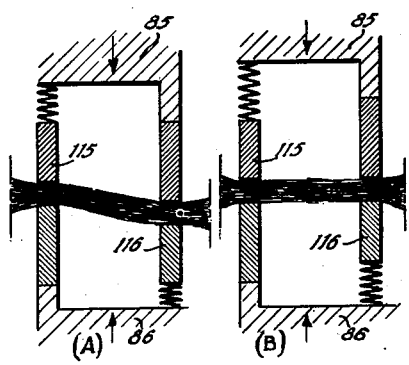
Figure 12:
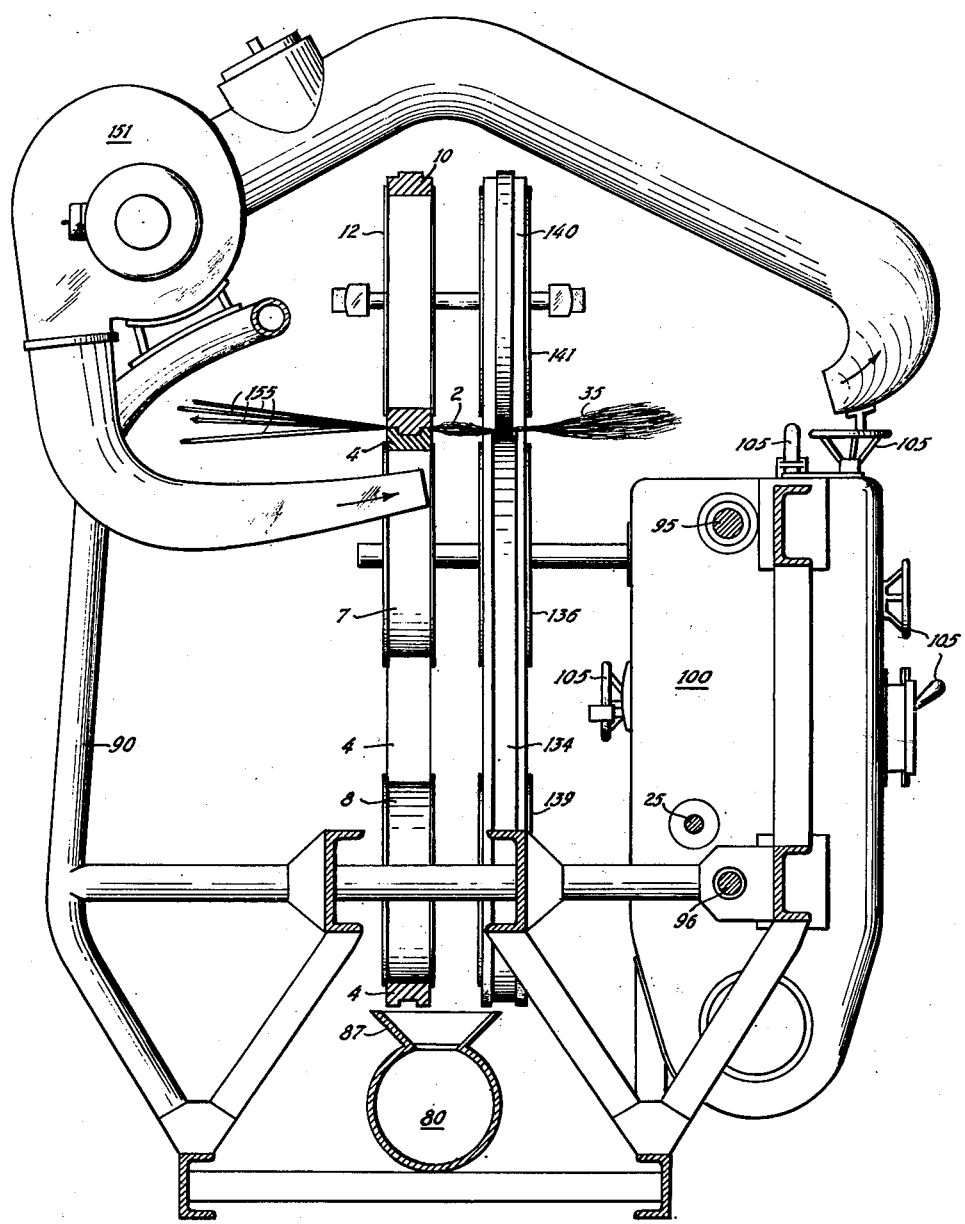

Fig. 11 comprises two schematic sectional views of the clamping and stretching means of this invention to illustrate its operation; and Fig. 12 is a sectional view taken along lines XII—XII in Figs. 1 and 2.

Referring to Figs. 1 and 2, there is shown a specific embodiment of one form of a machine for carrying out the method of this invention. At one end of the machine there is provided a table 1 upon which an operator lays the stalks or stems 2 of the dried plant to be dewooded with their root ends 3 all placed along the same edge of the table. These stems 2 are then pushed in a thin layer onto the lower conveyor belt 4 which is substantially flush with the top of the table 1 and moves from the table in the direction of the arrow 5. This conveyor belt 4 is endless and passes around four pulleys 6, 7, 8, and 9, one or more of which may be a driving pulley. This belt 4 surrounds the splitting, breaking, vibrating, and stretching mechanisms located in the first half of the machine for dewooding that portion of the fibers in the stems 2 extending toward the root ends 3 from the belt 4. Engaging the top trace of the belt 4 is another endless belt 10 which passes around pulleys 11 and 12 and is driven at the same speed as the belt 4 to hold the stems 2 against the top trace of the belt 4 sufficiently tight to prevent them from being pulled off of the belt 4 while said root halves of the stems are being processed.

Above the roots 3 on the table 1 there is provided a root pulverising mechanism 20 which may comprise a series of beveled ribs 21 mounted on the underside of a vertically vibrating hammering plate 22 (see Figs. 3) which may be driven by cam or eccentric mechanism 23 from a common drive shaft, such as 25 shown in Fig. 2. Co-operating with the downwardly extending ribs 21 there are provided co-operating interspaced beveled anvils 24 along slots 26 in the top of the table 1 through which the resulting pulverized roots may fall into a hopper 29 or suction pipe to be removed from the machine and collected if desired. At this place on the table 1, a reinforcement 27 may be located under the surface of the table to better withstand the pounding action of the ribs 21 of hammer 22. This hammer 22 need not vibrate more than about once a second, however its speed may be varied as desired depending upon the type and condition of the roots to be pulverized.

After the roots are pulverized, that half of the stems 2 is bent vertically downwards by a cam mechanism 30, which may be placed on the edge of the table and which may be adjusted and given a rotating and oscillating movement by an eccentric drive mechanism 31 (see Fig. 4) which also may be driven from the shaft 25 by chain 32. The advantage of such a device to bend the stems down is to prevent them from being broken off by abruptly bending them so that they still may be carried by the other and horizontal halves of the stems clamped onto the conveyor 4.

The now vertically hanging portions 35 of the stems 2 pass between the splitting and bending mechanisms shown in detail in Figs. 5 and 6, respectively, which mechanisms are mounted at 38 on co-operating vertically travelling endless chains 37 and 37' which pass around sprocket and drive wheels on rollers 39 and 40. The adjacent faces of these belts 37, which carry the rollers shown in Fig. 5 and adjacent thereto on another (or the same) chain belt 37' the bending blocks shown in Fig. 6, are held into alignment and engagement with each other by means of a series of fixed rollers 41 (see Fig. 4) located behind each one of the downward traces of the belts 37 and 37'.

Referring to Fig. 5, the stripping mechanism (mounted at 38 in Fig. 4) which is first contacted by the depending stems 35, may comprise two larger rollers 42 and 43 mounted on a support 44 pivoted at 45, and a single roller 46 mounted on a similar support 47 pivoted at 48. These pivoted supports are maintained in position with respect to each other by a pair of springs 49 on either side of the pivot 45, and a pair of springs 50 on either side of the pivot 48. These springs press against the mounting brackets 51 and 52 for the pivots 45 and 48, respectively, which brackets are connected to opposing chains 37. It should be noted that the distance between the rollers 42 and 46 is less than the distance between the rollers 43 and 46, as shown at 55 and 56 respectively, and that the roller 46 fits partially in between the rollers 42 and 43 to roll the stems 35 first loosely and then tightly around a curve which not only splits the stems into at least two ribbons but also partially loosens and cracks the woody material and pith adjacent the fibers and the stems.

Figure 4:
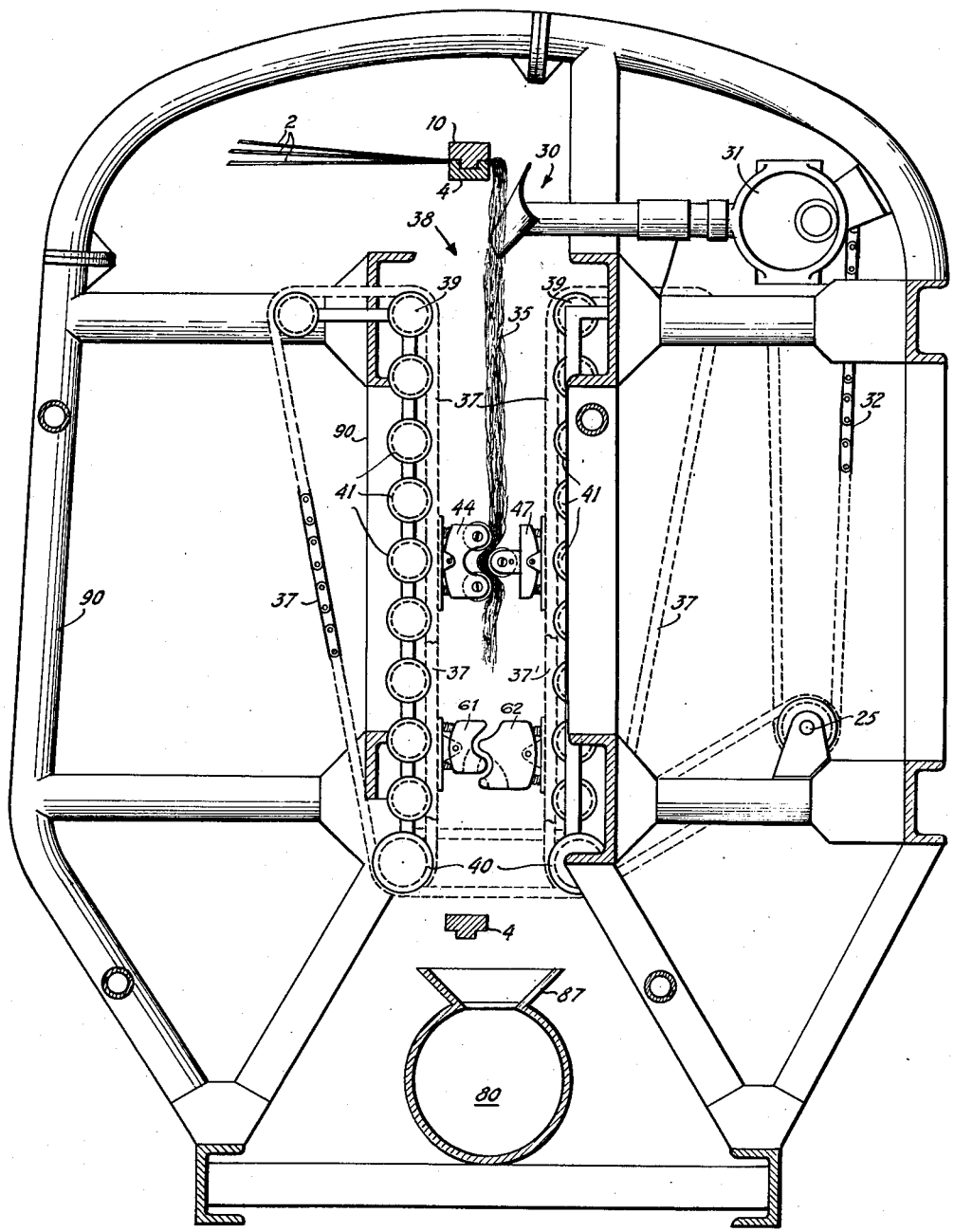
Fig. 4 is a sectional view of the splitting and/or breaking means taken along line IV—IV shown in Figs. 1 and 2 with part of chains broken away.
Figure 7:
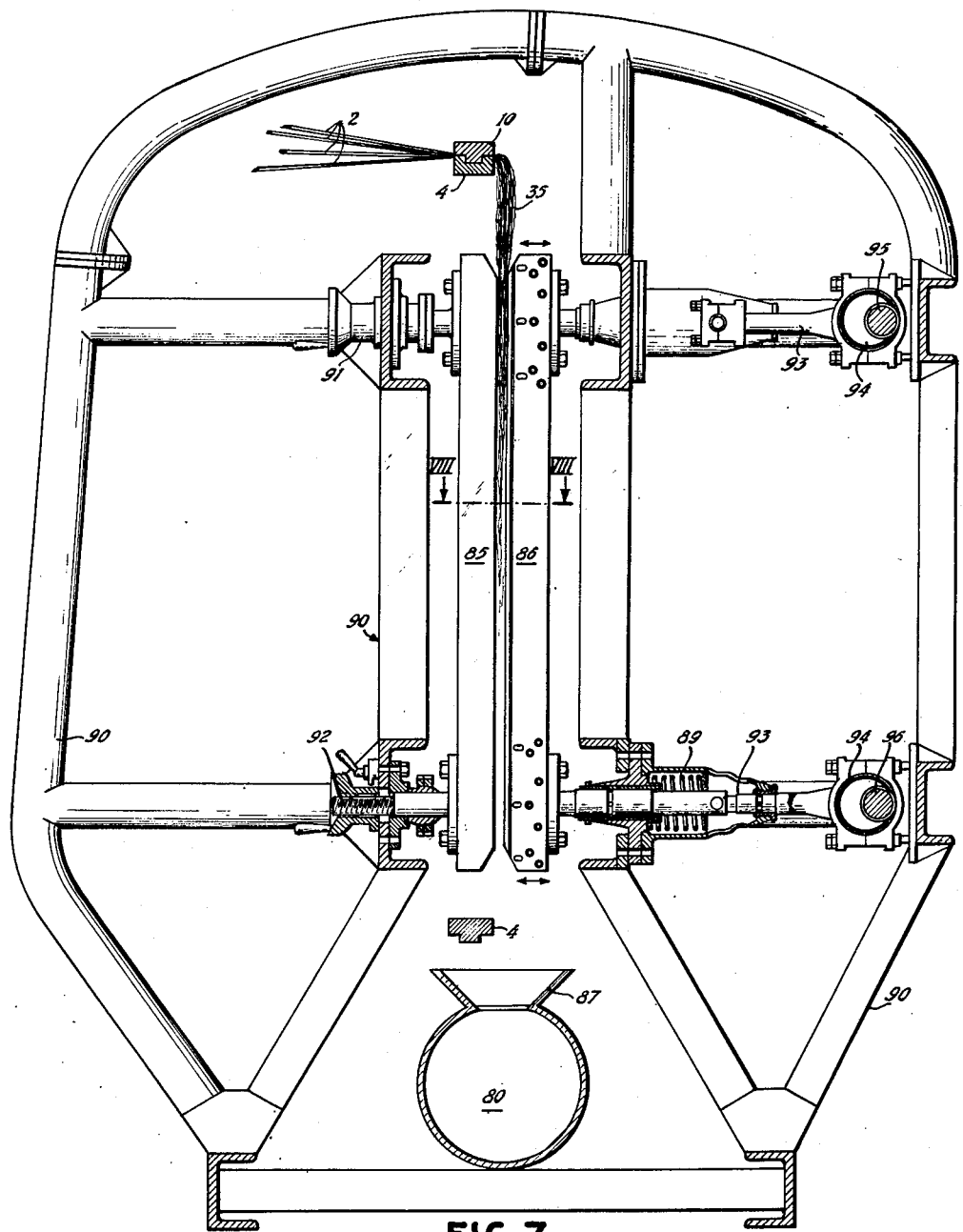
Fig. 7 is a sectional view taken along lines VII—VII in Figs. 1 and 2 with parts broken away.

Next the fibers 35 may be passed through a further and specific bending mechanism such as the S-shaped slot 60 between the blocks 61 and 62 (shown in Fig. 6) mounted on pivots 65 and 68 between springs 69 and 70, respectively, similar to the roller brackets 44 and 47 shown in Fig. 5. These blocks are also located in the position 38 on the adjacent chain 37' behind chain 37 as shown in Fig. 4. The fibers 35, thus first pass around the edge 71 on block 62, then around the wider bend 72 on block 61, then back around a sharp and narrow bend 73 on block 62, and finally over the edge 74 of block 61. This bending further loosens the woody materials from the fibers. The lower portions of each block 61 and 62 are provided with apertures 75 and 76, respectively, which open downwardly from the interior bends 73 and 72, respectively, through which particles which are broken from the stems may fall and be sucked away in a suitable suction pipe 80 having apertures 87 below the bending and stripping mechanism (shown in Figs. 1 and 4).

If desired, additional roller sets and/or bending blocks as shown in Figs. 5 and 6 may be positioned on the chains 37 to co-operate as shown at 38, depending upon the speed of rotation of the chains 37 and 37' with respect to the speed of travel of the conveyor belt 4. These splitting and bending mechanisms may also be driven from the shaft 25 shown in Figs. 2 and 4.

Figure 8:
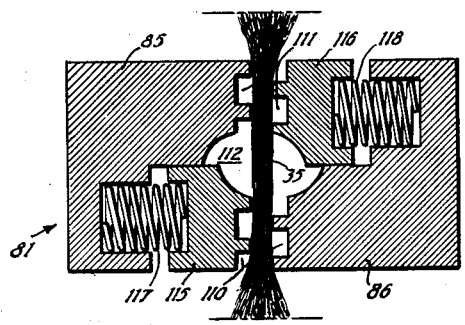
Figs. 8, 9 and 10 are cross-sectional views of different successive vibrating clamping and stretching means of this invention.

After the portions 35 have been bent by the mechanism shown in Fig. 6, they hang limply over the edge of the conveyor 4 and then pass successively through the clamping and stretching mechanisms of which there are shown in Fig. 1 three, namely 81, 82 and 83. Each one of these mechanisms comprises two lath-shaped clamping means 85 and 86 which co-operate with each other as shown in Fig. 4, one of which laths 85 may be fixed to the frame 90 by means of adjusting screws 91 and 92 to vary its distance from the other lath 86 which is vibrated or moved to and from the fixed lath 85, or if desired both laths may be moved. The movable lath 86 may operate against springs 89 and may be connected by two rods 93 to two eccentric mechanisms 94 mounted on rotating shafts 95 and 96, the speed of which shafts may be controlled and governed from a common driving mechanism or gear box 100 (see Figs. 2 and 12). A detailed cross section of the laths 85 and 86 of the mechanism 81 in their separated position is shown in Fig. 8, wherein the engaging edges of each lath are provided with parallel ribbed jaws 110 and 111, the ribs or teeth of which are interspaced to clamp, and also break or bend, the stems 35 passing between them.

The speed of vibration of lath 86 is generally between about 1000 and 2000 oscillations per minute and it thereby sets the fibers in the stems into vibration in the space 112 between the pairs of parallel jaws 110 and 111. Diagonally opposite jaws 115 and 116 of each pair of jaws on the laths 85 and 86 are shown to be resiliently mounted against springs 117 and 118, respectively, so that as soon as a stem 35 is clamped between the jaws, further movement of the lath 86 towards the lath 85 will pull the fibers 35 to stretch them as shown in position "A" of Fig. 11. The clamping of the fibers without stretching thereof is shown at position "B" in Fig. 11.

Figure 9:
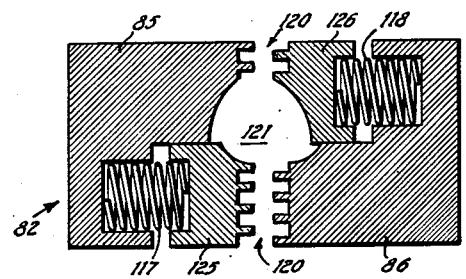
Figure 10:
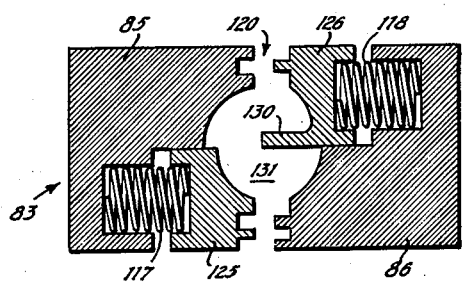

The second and third clamping means 82 and 83 are preferably provided with different size jaws and spaced teeth or ribs as shown at 120 in Figs. 9 and 10, respectively. Diametrically opposite jaws 125 and 126 are resiliently mounted as jaws 115 and 116 shown in Fig. 8, however, the space 121 between the two parallel pair of jaws on the members of 82 is greater than that space 112 shown for the first clamping and stretching means 81. In this space the fibers also vibrate, set up by the rapid motion of the laths 86, which aids in loosening the woody materials remaining with the fibers.

The third clamping and stretching means 83 may be the same as that shown in Fig. 10 with a still larger space 131 than space 121 between the jaws, and/or a projection 130 on one of the four jaws to further bend and stretch the fibers passing between its jaws.

These laths 81, 82, and 83 are preferably situated at a 45° angle to the direction of movement of the conveyor 4, in that the clamping means tends to bend the hanging limp fibers at the angle shown in Fig. 1 due to the retarding of their motion when they are clamped between the fast vibrating laths 86 and stationary laths 85. Thus the stems 35 pass through the length of each clamping and stretching means at substantially right angles to the jaws of these laths.

Although three separate clamping and stretching means are shown in Fig. 1 for treating the first half of the fibers 35, more or less of these clamping means may be employed without departing from the scope of this invention. Each successive clamping and stretching means may be adjusted by means of their respective screws 91 and 92 to stretch the fibers more than the previous means.

Just before the stems reach the end of the conveyor 4 and after they have passed through the last clamping and stretching means 83, they are transferred to another conveyor 134 (similar to 4) rotating at the same speed, in the same direction, and overlaping the end of conveyor 4, as shown at the center of Figs. 2 and 12. This conveyor 134 passes around pulleys 136, 137, 138 and 139 (similar to 6, 7, 8, and 9 for conveyor 4) and is also provided with an additional endless belt 140 (similar to 10) passing around pulleys 141 and to 142 to hold the fibers against the top trace of the conveyor 134.

The limp fiber ends 35 which now have been treated now may be lifted by a rotating paddle (not shown) or by the draft from a blower mechanism 151, to be raised into a horizontal position so as to be engaged by the conveyor 134 (see Fig. 12) before the untreated ends 155 of the stems 2 are released from the conveyor 4 and drop by gravity to pass through a similar line of splitting, bending, clamping, and stretching mechanisms, as those shown and just described for the first half of the machine. Herein, the stripping rollers and bending blocks are similarly mounted on chains 237 and 237' at 238 which chains are driven around rollers, corresponding to 37, 37', 38, 39 and 40 above described. From thence the ends 155 pass through a series of clamping and stretching laths 281, 282, 283 and 284 similar to 81, 82, 83, except that an additional stage is usually provided for the top ends of the stalks because these ends usually require more treatment to remove the woody materials than do the lower or root ends 35. This fourth and additional clamping and stretching means 284 may be identical in form with the previous clamping and stretching means 283. Similarly, each one of these clamping and stretching means have one lath vibrating through connections 293 to eccentric cams 294 mounted on drive shafts 295 connected to the gear box 100.

The gear box is preferably provided with one or more speed varying adjustments 105 and may include or be directly connected with an electric motor or other suitable source of energy for driving the machine.

To collect the dust and material stripped and shaken from the stems in the machine, there is preferably provided one or more hoppers 87 along the suction pipe 89 beneath the machine. The suction in this pipe may be provided by a suction fan 88 and is preferably separate from the blower mechanism 151 employed for transferring the stems from one conveyor to the other in the machine.

The non-fibrous and woody material removed from the fibers treated in this machine, are suitable for food for cattle in that they contain a high percentage of pectin and vegetable fat. Also, if desired, it may be used as a filler or base for a moulded plastic building material. This is possible since the stalks or plants have not previously been retted.

The dewooded fibers from the conveyor 134 may be collected on a bar or rod 201 in preparation for following treating operations to prepare the fibers for spinning.

These fibers are soft, souple, strong, and are not twisted which are advantages in handling and in the following treating operations.

While there is described above the principles of this invention in connection with specific apparatus, it is to be clearly understood that this description is made only by way of example and not as a limitation to the scope of this invention.

What is claimed is:

1. A method for removing woody materials from fibers in the stems of plants comprising: holding said stems to hang vertically downward, bending the stems to loosen the woody materials around the fibers and then repeatedly clamping successive longitudinal sections of said stems and stretching the fibers in said clamped sections at a rate of at least about one thousand times per minute to produce standing vibration waves along said fibers in each said section to throw off said woody materials from said fibers.

2. A method for removing woody materials from fibers in stems of plants comprising: holding said stems to hang vertically downward, breaking said stems to loosen said woody materials around said fibers and then rapidly and repeatedly at a rate of about at least one thousand times per minute, clamping and stretching successive short sections of said stems to produce standing vibration waves along said fibers in each said section to shake off the resulting loosened woody materials from said fibers.

3. A method for removing woody materials from the fibers in dry stems of plants comprising: holding said stems to hang vertically downward, rolling said stems to split said stems and expose said woody materials, bending said stems to loosen the resulting exposed woody materials around said fibers, and transversely clamping and longitudinally stretching short sections along said stems at a rate of about at least one thousand times per minute to produce standing vibration waves along the fibers of each said section, the fibers in which have a different and greater ductility and flexibility than said woody materials, to separate said woody material from said fibers.

4. The method of claim 3 wherein said clamping and stretching step is repeated at least twice in succession, and each time the fibers are stretched more than in the previous clamping and stretching step.

5. The method of claim 3 wherein said step of rolling said stems includes rolling said stems over a curved surface.

6. A method for removing woody materials from the fibers in dried stems of plants containing roots, said woody materials, and said fibers, comprising: pulverizing the root ends of said plants to remove said roots from said fibers, holding said stems to hang vertically downward, rolling the stems to split said stems and expose the woody materials in said stems, bending said stems to loosen the woody material around said fibers, and then longitudinally clamping and longitudinally stretching short sections along said stems at a rate of at least about one thousand times per minute to produce standing vibration waves in said fibers of each said section to separate said woody material from said fibers, said clamping and stretching step being repeated at least once.

7. A machine for removing woody material from fibers in the stems of plants comprising: clamping means having co-operating jaws, each jaw having at least two parts cooperating with corresponding parts on the opposing jaw to grip said stems transversely of their length at spaced points simultaneously along said stems, means resiliently mounting one part of each cooperating pair of parts alternately on opposing jaws so that only one part of adjacent pairs of parts on the same jaw are resiliently mounted, whereby the clamping of said stem in said jaws stretches that section of said stem in the space between said two points, means to open and close said jaws of said clamping means in rapid repetition, and means to move said stems longitudinally between said jaws.

8. The machine of claim 7 wherein said jaws include parallel interengaging teeth to break and bend said stems.

9. The machine of claim 7 wherein said clamping means comprises a pair of cooperating parallel laths having said jaws along parallel edges of said laths.

10. The machine of claim 9 including means to vibrate one of said laths with respect to said other lath.

11. The machine of claim 10 wherein other said lath includes means to adjust the minimum distance between said two laths.

12. The machine of claim 7 including means mounted between two adjacent parts and extending beyond cooperating ends of said parts on one of said jaws to increase the bending and stretching of said stems when said stems are clamped by said two adjacent parts between said jaws.

13. The machine of claim 7 wherein said means to open and close said jaws of said clamping means includes means to perform said operation at at least about 1000 times per minute.

14. The machine of claim 13 wherein said vibrating jaws are composed of a light weight rigid material.

15. A machine for removing woody material from fibers in the stems of plants comprising: means to split and to bend said stems to expose and to loosen said woody material, a pair of cooperating jaws, each jaw having spaced parts cooperating with corresponding parts on the opposing jaw to grip said stems transversely and simultaneously at spaced points along said stems, and means for vibrating said jaws to repeatedly clamp successive sections of said stems between said parts producing standing waves in the fibers in said sections to separate said woody material from said fibers.

16. The machine of claim 15 wherein said means to split and bend said stems comprises roller means to split said stems and means to move said roller means longitudinally of said stems.

17. The machine of claim 16 wherein said roller means comprises three rollers, two rollers moving along one side of said stems and the third roller moving along the other side of said stems partially in and between said two rollers.

18. The machine of claim 17 wherein the distance between said third roller and each of said two rollers is different.

19. The machine of claim 15 wherein said means to split and bend said stems includes a pair of S-shaped surfaced spaced cooperating blocks and means to move said stems longitudinally between said cooperating surfaces of said blocks.

20. The machine of claim 19 wherein the two bends of said S-shaped surfaces are of different curvature.

21. The machine of claim 20 wherein the distance between the adjacent surfaces at the bend of each of said blocks is different.

22. The machine of claim 15 wherein said means to split and bend said stems comprises opposing rollers to split said stems, and opposing irregular surfaced block means to bend said stems.

23. The machine of claim 22 wherein said means to split and bend said stems includes two opposing endless belt means to move correspondingly said opposing rollers and said opposing blocks longitudinally of said stems.

24. A machine for removing woody material from fibers in the stems of plants comprising: means to convey said stems in a row through said machine, roller means moving longitudinally of said stems to split said stems and expose the woody material therein, block means moving longitudinally of said stems to break said stems and loosen said woody material from said fibers in said stems, and vibrating means having a pair of spaced parallel jaws positioned transverse of said stems to clamp repeatedly said stems at two spaced points along said stems to vibrate and to stretch that portion of said stems in the space between said jaws to separate said woody material from said fibers.

25. The machine of claim 24 wherein said conveyor means comprises two engaging endless belts between which said stems are transversely held while they are moved through said machine.

26. A machine for removing woody material from fibers in the stems of plants containing roots, woody material, and fibers, comprising: means to pulverize said roots, means to split and to bend said stems to expose and to loosen said woody material from said fibers, and vibrating means having a pair of spaced parallel jaws to clamp said stems simultaneously at two spaced points repeatedly and transversely along their length to vibrate and to stretch that portion of said stems in said space between said jaws each time said stem is clamped whereby said woody material is separated from said fibers.

27. The machine of claim 26 wherein said pulverizing means comprises interengaging hammer and anvil grooves between which the root containing portions of said stems have said roots pulverized.

28. A machine for removing woody material from fibers in the stems of plants containing roots, woody material, and fibers, comprising: a feeding table on which said stems are laid and aligned with their roots all in the same direction, two sets of two opposing endless conveying belts between which said stems are held horizontally at a given point along said stems and moved through said machine, means on said table to pulverize said roots from said stems, means to bend the stems extending from one side of said belt vertically downward, roller means moving longitudinally of said vertically bent portions of said stems to split said stems and expose the woody material therein, block stripping means moving longitudinally of said vertically bent portions of said stems to bend said stems and loosen said woody material from said fibers, a plurality of successive vibrating lath means having a pair of spaced parallel jaws having at least two parts on each jaw cooperating with corresponding parts on the opposing jaw, said jaws being positioned transverse of said stems to clamp simultaneously repeatedly and successively between cooperating parts on said pair of jaws two spaced points along said vertically bent portions of said stems to vibrate and to stretch that portion of said stems between said points to separate said woody material from said fibers, means to transfer the resulting dewooded vertically bent portions of said stems onto the second set of said two opposing endless conveying belts, and similar means to successively split, bend, vibrate, and stretch the other portion of said stem extending on the other side of said first set of two opposing endless conveying belts to produce fibers free from roots and woody material.

29. The machine of claim 28 including means to vary the speeds of said means.

30. The machine of claim 28 including suction means to remove said woody material from said splitting, bending, vibrating, and stretching means.

31. The machine of claim 28 wherein said means to transfer the resulting dewooded portions of said stems comprises a blowing mechanism.

32. The machine of claim 28 including means to adjust the amount of stretch produced by each successive vibrating lath means.

33. A method for removing woody material from fibers in stems of plants comprising: holding said stems to hang vertically downward, bending said stems to loosen the woody materials adjacent said fibers, and then clamping successive longitudinal sections of said stems and stretching the fibers in said sections clamped at a rate of at least one thousand times per minute to produce variable standing vibration waves along said fibers in each said section to separate said woody materials from said fibers.

34. An apparatus for winning fibers from fibrous plant stems, comprising a pair of jaw members having at least two pairs of opposing clamping parts, means for moving said fibers between said jaw members, means moving said jaw members toward and from each other, means to fixedly support one of said parts of one pair on one jaw member, and means to resiliently support the other part of said one pair on the opposing jaw member, so that a fixed support of one pair lies adjacent a resilient support of the adjacent pair on the same jaw member.

35. A machine for removing woody material from fibers in stems of plants comprising: clamping means having cooperating jaws, means for moving said fibers between said jaws, each jaw having at least two cooperating parts with corresponding parts on the opposing jaw to grip said stems transversely of their length simultaneously at spaced points along said stems, and means to resiliently mount one of said parts of each pair of cooperating parts and of each pair of adjacent parts on the same jaw.

KAREL VONDERS.

References Cited in the file of this patent

UNITED STATES PATENTS

| Number | Name | Date |
|---|---|---|
| 988,151 | Summers | Mar. 28, 1911 |
| 1,371,805 | O'Neill | Mar. 15, 1921 |
| 1,390,922 | O'Neill | Sept. 13, 1921 |
| 1,403,830 | Barbieri | Jan. 17, 1922 |
| 1,592,317 | Wessel | July 13, 1926 |
| 2,244,971 | St. John | June 16, 1941 |
| 2,412,445 | Delegard et al. | Dec. 10, 1946 |

FOREIGN PATENTS

| Number | Country | Date |
|---|---|---|
| 466,695 | Great Britain | June 2, 1937 |
| 535,060 | Great Britain | Mar. 27, 1941 |
| 677,428 | Germany | June 26, 1939 |